(12) United States Patent
Tsubaki et al.

(10) Patent No.: US 11,749,464 B2
(45) Date of Patent: Sep. 5, 2023

(54) ELECTROLYTIC CAPACITOR

(71) Applicant: PANASONIC INTELLECTUAL PROPERTY MANAGEMENT CO., LTD., Osaka (JP)

(72) Inventors: Yuichiro Tsubaki, Kyoto (JP); Daisuke Kubo, Osaka (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/262,929

(22) PCT Filed: Jul. 26, 2019

(86) PCT No.: PCT/JP2019/029374
§ 371 (c)(1),
(2) Date: Jan. 25, 2021

(87) PCT Pub. No.: WO2020/022472
PCT Pub. Date: Jan. 30, 2020

(65) Prior Publication Data
US 2021/0142953 A1    May 13, 2021

(30) Foreign Application Priority Data
Jul. 26, 2018    (JP) ................. 2018-140626

(51) Int. Cl.
*H01G 9/035*    (2006.01)
*H01G 9/028*    (2006.01)
(Continued)

(52) U.S. Cl.
CPC ............ *H01G 9/028* (2013.01); *H01G 9/035* (2013.01); *H01G 9/145* (2013.01); *H01G 9/15* (2013.01); *H01G 9/10* (2013.01)

(58) Field of Classification Search
CPC .......... H01G 9/15; H01G 9/145; H01G 9/035; H01G 9/025; H01G 9/028
See application file for complete search history.

(56) References Cited

U.S. PATENT DOCUMENTS

2004/0223270 A1* 11/2004 Nitta ........................ H01G 9/02
361/15
2008/0316679 A1* 12/2008 Sugihara ................ H01G 9/035
361/504
(Continued)

FOREIGN PATENT DOCUMENTS

JP    H01-103821 A    4/1989
JP    2010-040776 A   2/2010
(Continued)

OTHER PUBLICATIONS

International Search Report and Written Opinion issued in International Patent Application No. PCT/JP2019/029374, dated Oct. 15, 2019; with partial English translation.

*Primary Examiner* — David M Sinclair
(74) *Attorney, Agent, or Firm* — McDermott Will & Emery LLP

(57) ABSTRACT

An electrolytic capacitor according to the present disclosure includes an anode body, a cathode body, a solid electrolyte, and a liquid component. The anode body has a surface provided with a dielectric layer. The solid electrolyte is in contact with the dielectric layer, is disposed between the anode body and the cathode body and contains conductive polymer. The liquid component is in contact with the dielectric layer and the solid electrolyte and contains a solvent and an acid component. The acid component contains a first polymer acid component including a sulfonic acid group or a carboxylic acid group.

14 Claims, 3 Drawing Sheets

(51) Int. Cl.
*H01G 9/145* (2006.01)
*H01G 9/15* (2006.01)
*H01G 9/10* (2006.01)

(56) References Cited

U.S. PATENT DOCUMENTS

| | | | |
|---|---|---|---|
| 2010/0033905 A1 | 2/2010 | Kobayakawa et al. | |
| 2012/0300368 A1 | 11/2012 | Matsuura et al. | |
| 2016/0064151 A1 | 3/2016 | Matsuura et al. | |
| 2016/0172117 A1* | 6/2016 | Kubo | H01G 9/048 |
| | | | 361/525 |
| 2016/0336117 A1* | 11/2016 | Koseki | H01G 9/151 |
| 2017/0148582 A1 | 5/2017 | Matsuura et al. | |
| 2018/0197685 A1* | 7/2018 | Tsubaki | H01G 9/0036 |
| 2018/0218849 A1 | 8/2018 | Matsuura et al. | |
| 2019/0006111 A1 | 1/2019 | Tsubaki et al. | |
| 2020/0143997 A1 | 5/2020 | Matsuura et al. | |
| 2020/0234889 A1 | 7/2020 | Tsubaki et al. | |
| 2020/0258693 A1 | 8/2020 | Matsuura et al. | |
| 2021/0142952 A1* | 5/2021 | Sato | H01G 9/15 |

FOREIGN PATENT DOCUMENTS

| | | | | |
|---|---|---|---|---|
| JP | 2010-251518 A | 11/2010 | | |
| JP | 2017-037950 A | 2/2017 | | |
| JP | 2017-147466 A | 8/2017 | | |
| JP | 2019-029498 A | 2/2019 | | |
| WO | WO-2017056447 A1 * | 4/2017 | | H01G 9/0032 |
| WO | WO-2017073062 A1 * | 5/2017 | | H01G 9/028 |
| WO | 2017/159243 A1 | 9/2017 | | |

* cited by examiner

ELECTROLYTIC CAPACITOR

CROSS-REFERENCE OF RELATED APPLICATIONS

This application is the U.S. National Phase under 35 U.S.C. § 371 of International Patent Application No. PCT/JP2019/029374, filed on Jul. 26, 2019, which in turn claims the benefit of Japanese Application No. 2018-140626, filed on Jul. 26, 2018, the entire disclosures of which Applications are incorporated by reference herein.

TECHNICAL FIELD

The present disclosure generally relates to electrolytic capacitors, and specifically, to an electrolytic capacitor including an anode body, a cathode body, a solid electrolyte, and a liquid component.

BACKGROUND ART

An electrolytic capacitor having a small size, large electrostatic capacitance, and low Equivalent Series Resistance (ESR) is regarded as promising. For example, an electrolytic capacitor is known which includes an anode body on which a dielectric layer is formed, a solid electrolyte layer formed to cover at least part of the dielectric layer, and an electrolytic solution, Wherein a conductive polymer is used as the solid electrolyte layer.

For example, Patent Literature 1 describes an electrolytic capacitor including: an anode body on which a dielectric layer is formed; a solid electrolyte layer in contact with the dielectric layer and an electrolytic solution. In the electrolytic capacitor described in the Patent Literature 1, the solid electrolyte layer includes a π-conjugated conductive polymer and first sulfonic acid, and the electrolytic solution includes a solvent and an acid component, wherein the acid component includes a second sulfonic acid.

Reaction of a dopant with a conductive polymer imparts a conductive property to the conductive polymer. During use of an electrolytic capacitor, the Equivalent Series Resistance (ESR) of the electrolytic capacitor may gradually increase. This is probably caused due to the dopant gradually released from the conductive polymer in an electrolytic solution (a de-doping phenomenon).

In the electrolytic capacitor described in Patent Literature 1, the sulfonic acid in the electrolytic solution suppresses the de-doping phenomenon.

When, however, the electrolytic capacitor is used, for example, in such a state where a high frequency is applied to the electrolytic capacitor, the electrolytic capacitor may generate heat, and the heat may esterify monomolecular sulfonic acid, so that the pH of the electrolytic solution may increase. Therefore, it may become difficult for the electrolytic capacitor described in Patent literature 1 to suppress the de-doping phenomenon over along time period and to suppress the ESR from changing.

CITATION LIST

Patent Literature

Patent Literature 1; WO 2017/159243 A1

SUMMARY OF INVENTION

An object of the present disclosure is to provide an electrolytic capacitor whose ESR is less likely to change.

An electrolytic capacitor according to one aspect of the present disclosure includes an anode body, a cathode body, a solid electrolyte, and a liquid component. The anode body has a surface provided with a dielectric layer. The solid electrolyte is in contact with the dielectric layer and is disposed between the anode body and the cathode body. The solid electrolyte contains a conductive polymer. The liquid component is in contact with the dielectric layer and the solid electrolyte and contains a solvent and an acid component. The acid component contains a first polymer acid component including a sulfonic acid group or a carboxylic acid group.

DESCRIPTION OF EMBODIMENTS

1. Schema

Figure 1:
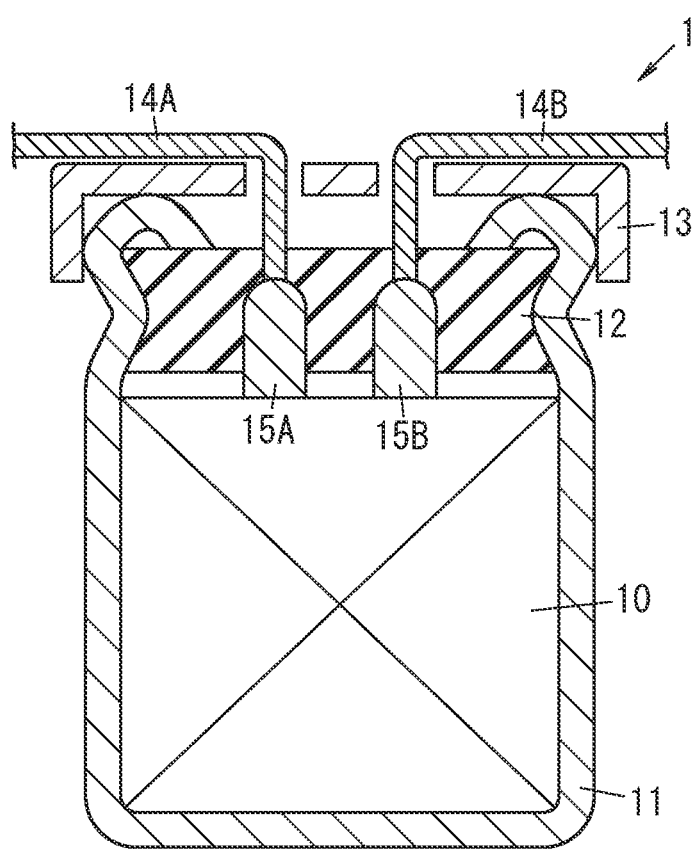
FIG. 1 is a sectional view schematically illustrating an electrolytic capacitor according to an embodiment of the present disclosure.
Figure 2:
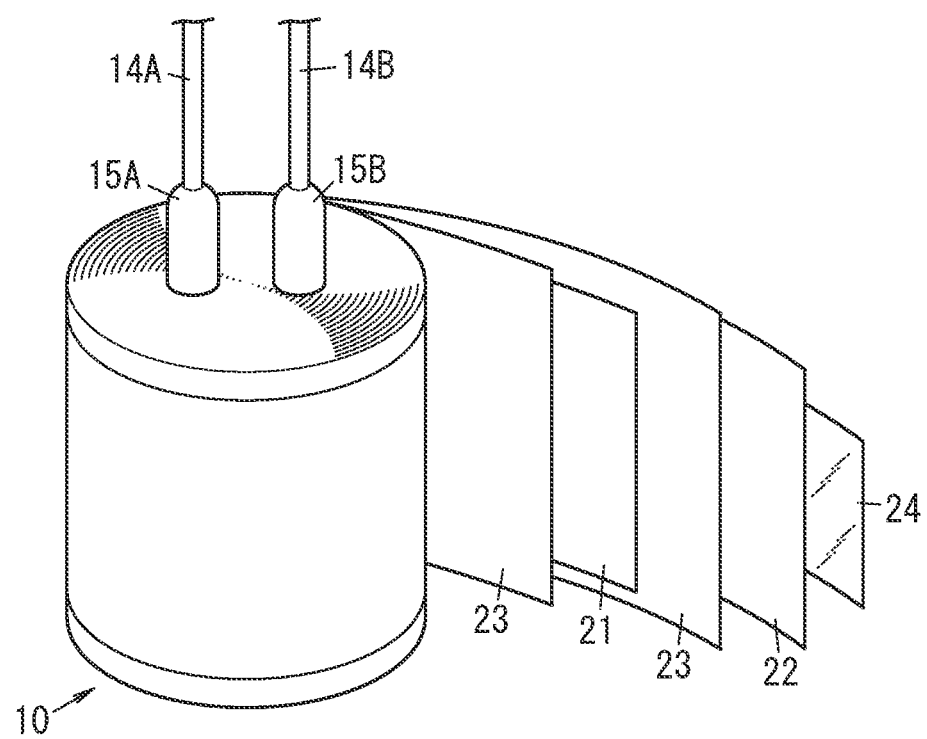
FIG. 2 is a perspective view schematically illustrating a capacitor element included in the electrolytic capacitor, where the capacitor element is partially expanded.
Figure 3:
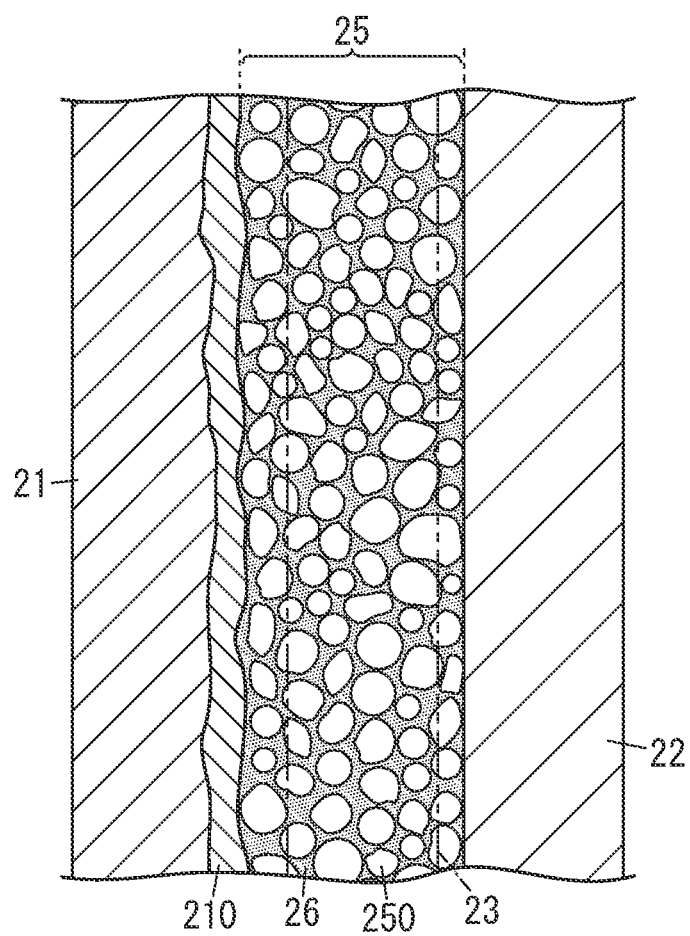
FIG. 3 is an enlarged view schematically illustrating a state where a solid electrolyte is formed between an anode body and a cathode body in the capacitor element.

As illustrated in FIGS. 1 to 3, an electrolytic capacitor 1 according to an embodiment of the present disclosure includes an anode body 21, a cathode body 22, a solid electrolyte 25, and a liquid component 26. The anode body 21 has a surface provided with a dielectric layer 210. The solid electrolyte 25 is in contact with the dielectric layer 210 and is located between the anode body 21 and the cathode body 22. The solid electrolyte 25 contains a conductive polymer 250. The liquid component 26 is in contact with the dielectric layer 210 and the solid electrolyte 25 and includes a solvent and an acid component. The acid component contains a first polymer acid component including a sulfonic acid group or a carboxylic acid group.

The first polymer acid component including the sulfonic acid group or the carboxylic acid group can suppress the de-doping phenomenon that a dopant is released from the conductive polymer 250. Moreover, the first polymer acid component including the sulfonic acid group or the carboxylic acid group is less likely to cause chemical reaction such as esterification reaction as compared to a monomolecular acid component. Therefore, even in an environment in which the electrolytic capacitor 1 is likely to generate heat, the pH of the liquid component 26 is less likely to increase, and the de-doping phenomenon can be suppressed over a long time period. Thus, the electrolytic capacitor 1 of the present embodiment can suppress the ESR from changing.

2. Details 2-1. Electrolytic Capacitor

The configuration of the electrolytic capacitor 1 according to the present embodiment will be described in detail below.

As illustrated in FIG. 1, the electrolytic capacitor 1 includes a capacitor element 10, a bottomed case 11 (hereinafter also referred to as a case 11), a sealing member 12, a seat plate 13, lead wires 14A and 14B, and lead tabs 15A and 15B.

(1) Bottomed Case

The case 11 is configured to accommodate the capacitor element 10 therein. Specifically, the case 11 is a tubular member and has a closed bottom part and a tip having an opening. Thus, from the opening of the case 11, the capacitor element 10 can be inserted into the case 11. The case 11 is made of, for example, one or more materials selected from the group consisting of aluminum, stainless steel, copper, iron, brass, and an alloy thereof.

(2) Sealing Member and Seat Plate

The opening of the case 11 is closed with the sealing member 12. The sealing member 12 is made of, for example, ethylene-propyleneterpolymer (EPT), a rubber material such as isobutylene-isoprene rubber (BR), or a resin material such as an epoxy resin. The sealing member 12 has a pair of through holes. The case 11 is drawn inward in the vicinity of its opening end, and the opening end is curled, thereby swaging the sealing member 12. Moreover, the sealing member 12 is covered with the seat plate 13. The seat plate 13 is made of, for example, an insulating resin material.

(3) Lead Wires and Lead Tabs

The pair of lead wires 14A and 14B are pulled out from the through holes formed in the sealing member 12 and penetrate through the seat plate 13. The pair of lead tabs 15A and 15B are embedded in the sealing member 12. The lead tab 15A electrically connects the lead wire 14A to an electrode of the capacitor element 10. The lead tab 15B electrically connects the lead wire 14B to an electrode of the capacitor element 10.

(4) Capacitor Element

The capacitor element 10, which is to be accommodated in the case 11, will be described in detail below.

As illustrated in FIG. 2, the capacitor element 10 of the present embodiment is a winding body. The winding body shown in FIG. 2 is in a state where the capacitor element 10 is taken out of the electrolytic capacitor 1 shown in FIG. 1 and is partially expanded.

The capacitor element 10 includes the anode body 21, the cathode body 22, and a separator 23. As illustrated in FIG. 2, the lead tab 15A is electrically connected to the anode body 21, and the lead tab 15B is electrically connected to the cathode body 22. Thus, the anode body 21 is electrically connected via the lead tab 15A to the lead wire 14A, and the cathode body 22 is electrically connected via the lead tab 15B to the lead wire 14B.

The separator 23 is disposed between the anode body 21 and the cathode body 22. The anode body 21, the cathode body 22, and the separator 23 are wound in this state. The separator 23 is, for example, nonwoven fabric containing cellulose, kraft, polyethylene terephthalate, polyphenylene sulfide, nylon, aromatic polyamide, polyimide, polyamide-imide, polyetherimide, rayon, glassy substance, vinylon, aramid fiber, or the like. The capacitor element 10 has an outermost perimeter fixed with a fixing tape 24.

In the capacitor element 10, the solid electrolyte 25 is formed between the anode body 21 and the cathode body 22. An enlarged view schematically illustrating this state is shown in FIG. 3. As illustrated in FIG. 3, the separator 23 holds the solid electrolyte 25.

(4-1) Anode Body

As illustrated in FIG. 3, the anode body 21 includes a metal foil and the dielectric layer 210 formed on a surface of the metal foil.

The surface of the metal foil is a roughened surface. This can increase the surface area of the metal foil and also increase area of the dielectric layer 210 to be formed on the surface of the metal foil. A method of roughening the surface is not particularly limited, but, for example, etching may be adopted as the method of roughening the surface. A material for the metal foil is not particularly limited but is preferably, for example, a valve action metal such as aluminum, tantalum, niobium or titanium, or an alloy containing the valve action metal.

The dielectric layer 210 is formed by performing a chemical conversion process on the surface of the metal foil. The chemical conversion process forms an oxide coating on the surface of the metal foil, and the oxide coating serves as the dielectric layer 210. As the chemical conversion process, for example, a method of applying a voltage to the metal foil immersed in a process liquid may be adopted. The process liquid is not particularly limited, but, for example, an ammonium adipate solution may be used as the process liquid.

(4-2) Cathode Body

As the cathode body 22, a metal foil similar to the metal foil used for manufacturing the anode body 21 may be used. The cathode body 22 may have a roughened surface. The surface of the cathode body 22 may be provided with, for example, a layer containing titanium or carbon.

(4-3) Solid Electrolyte

As illustrated in FIG. 3, the solid electrolyte 25 is in contact with the dielectric layer 210 and is disposed between the anode body 21 and the cathode body 22. The solid electrolyte 25 has fine voids therein and is thus porous. The solid electrolyte 25 has fine voids therein and is thus porous. The solid electrolyte 25 is formed by: impregnating the capacitor element 10 with a polymer dispersion containing a volatile liquid component and the conductive polymer 250 dispersed in the volatile liquid component; and vaporizing the volatile liquid component from the capacitor element 10. In this case, the voltage resistance characteristics of the electrolytic capacitor 1 can be improved. Thus, the solid electrolyte 25 contains the conductive polymer 250. The conductive polymer 250 is attached to at least part of a surface of the dielectric layer 210. Moreover, the conductive polymer 250 is attached to the separator 23.

As the volatile liquid component, for example, water, a nonaqueous solvent, or a mixture of water and the nonaqueous solvent may be used. As the nonaqueous solvent, a protic solvent or an aprotic solvent may be used. The protic solvent may contain, for example, at least either alcohols or ethers. The alcohols may contain, for example, one or more members selected from the group consisting of methanol, ethanol, propanol, butanol, ethylene glycol, and propylene glycol. The ethers may contain, for example, at least one of formaldehyde or 1,4-dioxane. The aprotic solvent may contain, for example, one or more members selected from the group consisting of amides, esters, and ketones. The amides may contain, for example, one or more members selected from the group consisting of N-methyl acetamide, N,N-dimethyl formamide, and N-methyl-2-pyrrolidone. The esters may contain, for example, methyl acetate. The ketones may contain, for example, methyl ethyl ketone.

The conductive polymer 250 preferably contains, for example, one or more components selected from the group consisting of polypyrrole, polythiophene, polyaniline, and a derivative thereof. For example, a derivative of the polythiophene contains poly(3,4-ethylenedioxythiophene) (PEDOT) and the like. The conductive polymer 250 may contain a homopolymer or may contain a copolymer. The weight average molecular weight of the conductive polymer 250 is not particularly limited but is, for example, 1000 to 100000.

In the conductive polymer 250, a dopant has been taken. The dopant enables the conductive polymer 250 to exhibit a conductive property. In the present embodiment, the dopant is a second polymer acid component. That is, the conductive polymer 250 preferably contains the second polymer acid component different from the first polymer acid component. In this case, the dopant (the second polymer acid component) is less likely to be released from the conductive polymer 250 as compared to a case where a monomolecular acid component is contained as the dopant, and in particular, the dopant (the second polymer acid component) is less likely to be released from the conductive polymer 250 even at a high temperature.

The second polymer acid component is preferably polymer sulfonic acid. In this case, the dopant (the second polymer acid component) is less likely to be released from the conductive polymer 250, and in particular, the dopant (the second polymer acid component) is less likely to be released from the conductive polymer 250 even at a high temperature. The second polymer acid component may contain, for example, one or more members selected from the group consisting of polyvinylsulfonic acid, polystyrenesulfonic acid, polyallylsulfonic acid, polyacrylic sulfonic acid, polymethacrylic sulfonic acid, poly(2-acrylamide-2-methylpropanesulfonic acid), and polyisoprenesulfonic acid.

The second polymer acid component particularly preferably contains the polystyrenesulfonic acid. In this case, the conductive polymer 250 is assumed to be coupled to the side chain of the polystyrenesulfonic acid in a dispersed manner like islands. Therefore, the dopant (the second polymer acid components) is less likely to be released from the conductive polymer 250, and in particular, the dopant (the second polymer acid components) is less likely to be released from the conductive polymer 250 even at a high temperature.

(4-4) Liquid Component

The capacitor element 10 is impregnated with the liquid component 26, and specifically, the liquid component 26 enters the plurality of voids formed in the solid electrolyte 25. Thus, the liquid component 26 is in contact with the dielectric layer 210 and the solid electrolyte 25.

The liquid component 26 may function as an electrolytic solution in the electrolytic capacitor 1. The liquid component 26 includes the solvent and the acid component. The oxidative effect of the acid component can repair a defect in the dielectric layer 210. Specifically, in the dielectric layer 210, a portion at which a metal foil of the anode body 21 is exposed can be oxidized to form a dielectric layer 210.

The solvent may contain, for example, one or more components selected from the group consisting of a glycol compound, a sulfone compound, a lactone compound, a carbonate compound, an alcohol, and a polyol.

The glycol compound may contain, for example, one or more members selected from the group consisting of ethylene glycol (EG), diethylene glycol, triethylene glycol, propylene glycol, polyethylene glycol (PEG), and polyalkylene glycol.

The sulfone compound may contain, for example, one or more components selected from the group consisting of sulfolane, 3-methyl sulfolane, dimethylsulfoxide, and diethyl sulfoxide.

The lactone compound may contain, for example, one or more members selected from the group consisting of γ-butyrolactone, β-butyrolactone, α-valerolactone, and γ-valerolactone.

The carbonate compound may contain, for example, one or more components selected from the group consisting of dimethyl carbonate (DMC), diethyl carbonate (DEC), ethyl methyl carbonate (EMC), ethylene carbonate (EC), propylene carbonate (PC), and fluoroethylene carbonate (FEC).

The alcohol may contain one or more members selected from the group consisting of methanol, ethanol, propanol, butanol, cyclobutanol, cyclohexanol, methyl cellosolve, and ethyl cellosolve.

The solvent preferably contains the glycol compound. Since the glycol compound is less likely to evaporate, the solvent in the liquid component 26 can be suppressed from being reduced by the solvent vaporized and passing through a gap between the case 11 and the sealing member 12 or through the sealing member 12 itself.

Of the glycol compound, a polyalkylene glycol having three or more carbon atoms per repeating unit is preferable. That is, the solvent preferably contains the polyalkylene glycol having three or more carbon atoms per repeating unit. The polyalkylene glycol having three or more carbon atoms per repeating unit has a chain longer and is less likely to evaporate than a polyalkylene glycol having two carbon atoms per repeating unit such as the polyethylene glycol. Thus, the solvent in the liquid component 26 can be suppressed from being reduced. Moreover, when the solvent contains the polyalkylene glycol having three or more carbon atoms per repeating unit, the solidifying point of the solvent can be lowered, and the electrolytic capacitor 1 is thus readily used at a low temperature. Of the polyalkylene glycol having three or more carbon atoms per repeating unit, polypropylene glycol is particularly preferable. The percentage of the polyalkylene glycol having three or more carbon atoms per repeating unit to the total amount of the liquid component 26 is preferably greater than or equal to 5 weight % and less than or equal to 95 weight %.

The solvent preferably contains a polyol including two or more hydroxyl groups of the polyol. In this case, the solvent in the liquid component 26 can be suppressed from being reduced, and therefore, a state where the liquid component 26 exists around the conductive polymer 250 can be maintained. Thus, oxidation deterioration of the conductive polymer 250 can be suppressed, and the solid electrolyte 25 can be suppressed from being deteriorated. Moreover, when second polymer acid component contains, for example, the polystyrenesulfonic acid, the polyol including two or more hydroxyl groups can extend the polymeric chain of the polystyrenesulfonic acid in the conductive polymer 250. That is, the conductive polymer 250 can be swollen. In this case, the conductive property of the conductive polymer 250 can be improved.

Of the polyol including two or more hydroxyl groups, one or more members selected from the group consisting of glycerol and polyglycerol are particularly preferable. That is, the polyol preferably contains one or more members selected from the group consisting of glycerol and polyglycerol. In this case, as compared to a case where the solvent contains the ethylene glycol or the like, the solvent in the liquid component 26 is easily suppressed from being reduced. The percentage of the sum of the glycerol and the polyglycerol to the total amount of the liquid component 26 is preferably greater than or equal to 5 weight % and less than or equal to 95 weight %.

The acid component of the present embodiment contains the first polymer acid component including a sulfonic acid group or a carboxylic acid group. This can suppress the de-doping phenomenon that the dopant (the second polymer acid component) is released from the conductive polymer 250. Moreover, the first polymer acid component is preferable because the first polymer acid component is less likely to cause chemical reaction such as, esterification reaction as compared to a monomolecular acid component. Thus, even in an environment in which the electrolytic capacitor 1 is likely to generate heat, the pH of a liquid component 26 is less likely to increase, and thus, the de-doping phenomenon can be suppressed. The first polymer acid component may be a homopolymer or may be a copolymer. The first polymer acid component may contain a polymer or may contain oligomer.

The first polymer acid component preferably contains the sulfonic acid group. In this case, the de-doping phenomenon that the second polymer acid component is released from the conductive polymer 250 can be suppressed. Moreover, the first polymer acid component including the carboxylic acid group is less likely to cause chemical reaction such as esterification reaction. The acid component may contain, for example, one or more members selected from the group consisting of polyvinylsulfonic acid, polystyrenesulfonic acid, polyallylsulfonic acid, polyacrylic sulfonic acid, polymethacrylic sulfonic acid, poly(2-acrylamide-2-methyl-propanesulfonic acid), and polyisoprenesulfonic acid. Thus, the first polymer acid component preferably contains, for example, one or more members selected from the group consisting of polyvinylsulfonic acid, polystyrenesulfonic acid, polyallylsulfonic acid, polyacrylic sulfonic acid, polymethacrylic sulfonic acid, poly(2-acrylamide-2-methyl-propanesulfonic acid), polyisoprenesulfonic acid, polyacrylic acid, and polymethacrylic acid.

In particular, the first polymer acid component particularly preferably contains the polystyrenesulfonic acid. In this case, the de-doping phenomenon that the second polymer acid component is released from the conductive polymer 250 can be suppressed. Moreover, the polystyrenesulfonic acid is preferable because it is less likely to cause chemical reaction such as esterification reaction.

Moreover, when the first polymer acid component contains the first polymer acid component containing the carboxylic acid group, the acid component preferably contains, for example, one or more members selected from the group consisting of polyacrylic acid and poly methacrylic acid.

The first polymer acid component is preferably the same kind as the second polymer acid component. In this case, even when the de-doping phenomenon that the second polymer acid component is released from the conductive polymer 250 occurs, the first polymer acid component, in place of the second polymer acid component released from the conductive polymer 250, can be reacted with (doped again in) the conductive polymer 250. Thus, the conductive property of the conductive polymer 250 can be maintained, and the ESR of the electrolytic capacitor 1 can be suppressed from being reduced.

Specifically, when the second polymer acid component contained in the conductive polymer 250 is polymer sulfonic acid, the first polymer acid component is more preferably polymer sulfonic acid. Moreover, when the second polymer acid component is polystyrenesulfonic acid, the first polymer acid component is also preferably polystyrenesulfonic acid.

Note that saying that the first polymer acid component and the second polymer acid component are the same kinds includes not only the case where the first polymer acid component and the second polymer acid component have exactly the same compositions but also the case where their compositions are similar. For example, the first polymer acid component and the second polymer acid component are the same in terms of chemical structure formula but may be different from each other in terms of polymerization degree. For example, the first polymer acid component and the second polymer acid component are similar in terms of chemical structure but may have partially different substitution groups.

The weight average molecular weight of the first polymer acid components is preferably less than the weight average molecular weight of the second polymer acid component. In this case, excessive increase in viscosity can be suppressed, anions are easily dissociated, and the anions easily move in the solvent in the liquid component 26. Moreover, in the conductive polymer 250, the second polymer acid components hardly move, and the de-doping phenomenon is thus easily suppressed. Moreover, when the second polymer acid component is dedoped from the conductive polymer 250, the first polymer acid component is easily reacted with (doped again in) the conductive polymer 250. For example, when the first polymer acid component and the second polymer acid component are polystyrenesulfonic acid, the weight average molecular weight of the polystyrenesulfonic acid in the liquid component 26 is preferably less than the weight average molecular weight of the polystyrenesulfonic acid in the conductive polymer 250.

The weight average molecular weight of the first polymer acid component is preferably less than or equal to 100000. In this case, the electrode can be suppressed from being corroded by the first polymer acid component, and a defect in the dielectric layer 210 can be easily repaired by the first polymer acid component.

The concentration of the first polymer acid component in the liquid component 26 is preferably greater than or equal to 10 mass % and less than or equal to 40 mass %, more preferably greater than or equal to 15 mass % and less than or equal to 35 mass %. In this case, the de-doping phenomenon is particularly easily suppressed.

The acid component may contain a component other than the first polymer acid component. The component other than the first polymer acid component is classified into the acid component. The acid component preferably contains, for example, the monomolecular acid component. In this case, the de-doping phenomenon that the second polymer acid component is released from the conductive polymer 250 can be further suppressed.

The monomolecular acid component preferably contains organic acid. The organic acid may contain, for example, one or more members selected from the group consisting of phthalic acid, isophthalic acid, terephthalic acid, maleic acid, adipic acid, benzoic acid, toluic acid, enanthic acid, malonic acid, 1,6-decane di carboxylic acid, 1,7-octane dicarboxylic acid, azelaic acid, salicylic acid, oxalic acid, and glycolic acid.

The monomolecular acid component may contain inorganic acid. The inorganic acid may contain, for example, one or more members selected from the group consisting of boric acid, phosphoric acid, phosphorous acid, hypophosphorous acid, boric acid ester, phosphoric acid ester, carbonic acid, and silicic acid.

It is also preferable that the monomolecular acid component contains, for example, a composite acid compound of the organic acid and the inorganic acid. the composite acid compound preferably contains one or more members selected from the group consisting of borodisalicylic acid, borodiglycolic acid, and borodioxalic acid.

For example, when the first polymer acid component has a sulfonic acid group, the acid component preferably contains a monomolecular acid component having a sulfonic acid group. The monomolecular acid component preferably contains at least one of aliphatic sulfonic acid or aromatic sulfonic acid.

For example, when the first polymer acid component has a carboxylic acid group, the acid component preferably contains a monomolecular acid component having a carboxylic acid group. The monomolecular acid component preferably contains at least one of aliphatic carboxylic acid or aromatic carboxylic acid.

Specifically, when the acid component contains the monomolecular acid component, the acid component preferably contains one or both of the borodisalicylic acid and the phthalic acid. In particular, when the first polymer acid component contains the polystyrenesulfonic acid, the acid component preferably contains the borodisalicylic acid or the phthalic acid as the monomolecular acid component. The monomolecular acid component may, of course, contain a monomolecular acid component other than the borodisalicylic acid and the phthalic acid.

The liquid component 26 may contain a component other than the solvent and the acid component. The liquid component 26 may contain, for example, a basic component. In this case, at least part of the acid component can be neutralized, and while the concentration of the acid component is increased, the electrode can be suppressed from being corroded by the acid component.

In the liquid component 26, the equivalent ratio of the acid component is preferably greater than the equivalent ratio of the basic component. In this case, the de-doping phenomenon can be effectively suppressed. The equivalent ratio of the acid component to the basic component is desirably 1.0 to 30. Moreover, the concentration of the basic component in the liquid component is preferably greater than or equal to 0.1 mass % and less than or equal to 20 mass %, more preferably greater than or equal to 3 mass % and less than or equal to 10 mass %.

The basic component preferably contains one or more components selected from the group consisting of a primary amine compound, a secondary amine compound, a tertiary amine compound, and a quaternary ammonium compound. Since these components have high heat resistance, these components can suppress the liquid component 26 from being deteriorated by heat. Examples of these components include methyl amine, dimethyl amine, trimethyl amine, ethyl amine, diethyl amine, triethyl amine, ethylene diamine, N,N-diisopropyl ethyl amine, tetramethyl ethylene diamine, hexamethylene diamine, spermidine, spermine, amantadine, aniline, phenethylamine, toluidine, pyrrolidine, piperidine, piperazine, morpholine, imidazole, pyridine, pyridazine, pyrimidine, pyrazine, 4-dimethyl amino pyridine, and diethyl dimethyl ammonium salt. The basic component may contain one or more of these components.

The solvent may contain the solvent, the acid component, a component other than the basic component, an additive, and the like.

The pH of the liquid component 26 is preferably lower than or equal to 4, more preferably lower than or equal to 3.8, and much more preferably lower than or equal to 3.6. When the pH of the liquid component 26 is lower than or equal to 4, the de-doping phenomenon is easily suppressed. The lower limit value of the pH of the liquid component 26 is not particularly limited but is, for example, higher than or equal to 2.0.

2-2. Manufacturing Method of Electrolytic Capacitor

Steps in an example of a manufacturing method of the electrolytic capacitor 1 will be described below.

(1) Formation of Anode Body

First, a metal foil which is a raw material of the anode body 21 is prepared. A surface of the metal foil may be roughened to form fine recesses and projections on the surface of the metal foil. The surface of the metal foil may be roughened by subjecting the metal foil to, for example, an etching process. As the etching process, for example, a direct current electrolytic process or an alternating current electrolytic process may be adopted.

Then, the dielectric layer 210 is formed on the roughened surface of the metal foil. A method of forming the dielectric layer 210 is not particularly limited but, for example, the dielectric layer 210 may be formed by subjecting a metal foil to a chemical conversion process. In the chemical conversion process, for example, a metal foil having a roughened surface is immersed in a chemical conversion liquid such as an ammonium adipate solution and is then heated or applied with a voltage. The anode body 21 having a surface provided with the dielectric layer 210 may be formed by cutting the metal foil after the chemical conversion process into a desired size. Alternatively, the anode body 21 may be formed by cutting a metal foil into a desired size in advance and then providing the dielectric layer 210 on the metal foil having the desired size. The lead wire 14A is connected to the anode body 21. A method of connecting the anode body 21 and the lead wire 14A to each other is not particularly limited but may use, for example, jointing by swaging or ultrasonic wave welding.

(2) Formation of Cathode Body

The cathode body 22 may be formed from a metal foil by a similar method to the anode body 21.

The lead wire 14B is connected to the cathode body 22. A method of connecting the cathode body 22 and the lead wire 14B to each other is not particularly limited but may use, for example, swaging and/or an ultrasonic wave.

If necessary, the surface of the cathode body 22 may be roughened, or a layer containing titanium and/or carbon may be formed on the surface of the cathode body 22.

(3) Formation of Winding Body

In this step, the anode body 21, the cathode body 22, and the separator 23 are used to form the winding body as illustrated in FIG. 2. An end of the cathode body 22 located on an outermost layer is fixed with the fixing tape 24. When the anode body 21 is formed by cutting a large metal foil, the winding body may be further subjected to a chemical conversion process to provide a dielectric layer on the cutting surface of the anode body 21.

The sealing member 12 is disposed in such a state that the lead wires 14A and 14B taken out of the anode body 21 and the cathode body 22 are pulled out through the through holes formed in the sealing member 12.

(4) Formation of Capacitor Element

In this step, the solid electrolyte 25 containing the conductive polymer 250 is formed on the surface of the dielectric layer 210 formed on the surface of the anode body 21, thereby forming the capacitor element 10.

The solid electrolyte 25 may be formed by attaching the conductive polymer 250 formed in advance to the dielectric layer 210. In this case, a polymer dispersion containing the conductive polymer 250 is preferably used. The polymer dispersion contains the volatile liquid component and the conductive polymer 250 dispersed in the volatile liquid component and doped with a dopant. For example, the winding body is impregnated with the polymer dispersion and is then dried, and thereby, the solid electrolyte 25 may be attached to the surface of the dielectric layer 210. In this case, the solid electrolyte 25 may be attached to the surface of the separator 23 and also the surface of the cathode body 22. Moreover, the conductive polymer 250 may be attached to the separator 23. This step may be repeated two or more times. In this case, the coverage factor of the solid electrolyte 25 to the dielectric layer 210 can be increased.

(5) Impregnation with Liquid Component

Then, the capacitor element 10 is impregnated with the liquid component 26. This enables the liquid component 26 to enter fine voids formed in the solid electrolyte 25. Thus, the liquid component 26 comes into contact with the dielectric layer 210 and the solid electrolyte 25. A method of impregnating the capacitor element 10 with the liquid component 26 is not particularly limited.

(6) Sealing of Capacitor Element

Next, the capacitor element 10 is accommodated in the case 11.

Then, a lateral drawing process is performed in the vicinity of an opening end of the case 11 to swage the opening end on the sealing member 12 and curl the opening end. Then, the seat plate 13 is disposed at a side of the opening end thus curled.

Through these steps, the electrolytic capacitor 1 as illustrated in FIG. 1 is obtained. Thereafter, an aging process may be performed while a rated voltage is applied.

2-3. Application of Electrolytic Capacitor

The application of the electrolytic capacitor 1 is not particularly limited. The electrolytic capacitor 1 may be used in a substrate of an engine control unit (ECU) of an automobile, a switching power supply, or the like of an automobile, for example. The automobile is mainly assumed to be an electric car, a hybrid car, or the like but may be a gasoline engine car or a diesel engine car. The electrolytic capacitor 1 is also applicable to, for example, two-wheel vehicles (including electric bikes (e-bikes)), airplanes, ships, and drones. Moreover, the electrolytic capacitor 1 may be used in, for example, a power supply device of a Central Processing Unit (CPU) of server devices, computer devices, and video game consoles. In addition, the electrolytic capacitor 1 may be used in, for example, a power supply device of a Field-Programmable Gate Array (FPGA) such as a communication device and an industry apparatus, and a power supply device of a Graphics Processing Unit (GPU) such as a graphic board. The application of the electrolytic capacitor 1 is not limited to these examples, but the electrolytic capacitor 1 is applicable to various fields.

2-4. Variations

The configuration of the electrolytic capacitor 1 is not limited to the configuration of the above-described embodiment.

For example, the capacitor element 10 does not have to be a winding body but may be of a chip type that includes a sintered body made of metal as the anode body or of a stacked layer type that includes a metal plate as the anode body.

For example, the solid electrolyte 25 does not have to be formed from the polymer dispersion, but a polymerization liquid may be given to the dielectric layer 210 to form the solid electrolyte 25 in situ by a chemical polymerization method or an electrolytic polymerization method. That is, the conductive polymer 250 may be formed by the chemical polymerization method or the electrolytic polymerization method using the polymerization liquid. The polymerization liquid is a solution containing a monomer, an oligomer, a dopant, or the like. When the conductive polymer 250 is formed by the chemical polymerization, an oxidant is preferably added to the polymerization liquid. The polymerization liquid preferably contains, for example, one or more components selected from the group consisting of pyrroll, aniline, thiophene, and a derivative thereof. The polymerization liquid in this case contains the dopant, but the dopant is not limited to the above-described second polymer acid component but may be, for example, monomolecular acid component having a sulfonic acid group.

EXAMPLE

The present disclosure will be described in more detail based on examples. However, the present disclosure is not limited to the following examples.

In the below-described examples, winding-type electrolytic capacitors (Φ10 mm×L (height) 10 mm) each having a rated voltage of 25 V and a rated electrostatic capacitance of 330 μF were manufactured. A specific manufacturing method of the electrolytic capacitors will be described below.

(Preparation of Anode Body)

An aluminum foil having a thickness of 100 μm was subjected to an etching process to roughen the surface of the aluminum foil. Then, a dielectric layer was formed on the surface of the aluminum foil by a chemical conversion process. The chemical conversion process was performed by immersing the aluminum foil in an ammonium adipate solution and then applying a voltage of 50 V to the aluminum foil. Thereafter, the aluminum foil was cut to prepare the anode body.

(Preparation of Cathode Body)

An aluminum foil having a thickness of 50 μm was subjected to an etching process to roughen the surface of the aluminum foil. Then, the aluminum foil was cut to prepare the cathode body.

(Formation of Winding Body)

An anode lead tab and a cathode lead tab are respectively connected to the anode body and the cathode body, and the anode body and the cathode body are wound with a separator made of cellulose provided therebetween while the lead tabs are wound together, thereby obtaining a winding body. The anode lead wire and the cathode lead wire were connected to respective ends of the lead tubs, the respective ends protruding from the winding body. The winding body thus formed was subjected to the chemical conversion process again, thereby forming a dielectric layer at the cut end of the anode body. Then, an end on the outer surface of the winding body was fixed with a fixing tape. In this way, a plurality of winding bodies were formed.

(Preparation of Polymer Dispersion)

In ion-exchanged water, 3,4-ethylenedioxythiophene and polystyrenesulfonic acid (PSS, weight average molecular weight 100,000) which is a polymer dopant were dissolved, thereby preparing a mixed solution. While the mixed solution was stirred, a sulfuric acid iron (III) (oxidant) dissolved in the ion-exchanged water was added, thereby causing polymerization reaction. After the reaction, the obtained reaction liquid was dialyzed, and an unreacted monomer and excessive oxidant were removed, thereby obtaining a polymer dispersion containing about 5 mass % of polyethylene dioxythiophene doped with PSS (PEDOT/PSS).

(Formation of Solid Electrolyte Layer)

In a depressurized atmosphere (40 kPa), the winding bodies were immersed, for 5 minutes, in a polymer dispersion accommodated in a prescribed container, and then, the winding bodies were pulled out of the polymer dispersion.

Then, the winding bodies impregnated with the polymer dispersion were dried in a drying furnace at 150° C. for 20 minutes, thereby forming a solid electrolyte layer including a conductive polymer layer covering at least part of the dielectric layer.

(Impregnation of Electrolytic Solution)

Electrolytic solutions containing electrolyte salts and solvents shown in Table 1 at ratios shown in Table 1 were prepared, and winding bodies were immersed in respective liquid components (the respective electrolytic solutions) in a depressurized atmosphere (40 kPa) for 5 minutes.

(Sealing of Capacitor Element)

Capacitor elements impregnated with the respective electrolytic solutions were sealed to complete the electrolytic capacitors (Examples 1 to 10 and Comparative Examples 1 and 2) as illustrated in FIG. 1, Thereafter, an aging process was performed at 130° C. for 2 hours while a rated voltage is applying.

electrolyte (25), and a liquid component (26). The anode body (21) has a surface provided with a dielectric layer (210). The solid electrolyte (25) is in contact with the dielectric layer (210) and is disposed between the anode body (21) and the cathode body (22). The solid electrolyte (25) contains a conductive polymer (250). The liquid component (26) is in contact with the dielectric layer (210) and the solid electrolyte (25) and contains a solvent and an acid component. The acid component contains a first polymer acid component including a sulfonic acid group or a carboxylic acid group.

According to the first aspect, the first polymer acid component including the sulfonic acid group or the carboxylic acid group suppresses the de-doping phenomenon that the dopant is released from the conductive polymer (250). Moreover, the first polymer acid component including the sulfonic acid group or the carboxylic acid group is less likely to cause chemical reaction such as esterification reaction as

TABLE 1

| | ELECTROLYTIC SALT | | | | | SOLVENT [wt %] | | | | | Δ ESR |
| | FIRST POLYMER ACID | | MONOMOLECULAR | | | | | | | | |
| | COMPONENT | [wt %] | ACID | [wt %] | [wt %] | GBL | SL | EG | GOL | PGOL | X/X₀ |
|---|---|---|---|---|---|---|---|---|---|---|---|
| EXAMPLE 1 | PSS-TEA | 5 | — | — | 95 | 70 | 25 | | | | 1.46 |
| EXAMPLE 2 | PSS-TEA | 10 | — | — | 90 | 65 | 25 | | | | 1.33 |
| EXAMPLE 3 | PSS-TEA | 20 | — | — | 80 | 60 | 20 | | | | 1.37 |
| EXAMPLE 4 | PSS-TEA | 1 | BS-TEA | 10 | 89 | 64 | 25 | | | | 1.34 |
| EXAMPLE 5 | PSS TEA | 1 | FS-TEA | 10 | 89 | 64 | 25 | | | | 1.31 |
| EXAMPLE 6 | PSS TEA | 10 | — | — | | | | 90 | | | 1.27 |
| EXAMPLE 7 | PSS-TEA | 10 | — | — | | | | | 90 | | 1.26 |
| EXAMPLE 8 | PSS-TEA | 10 | — | — | | | | | | 90 | 1.27 |
| EXAMPLE 9 | POLYACRYLIC ACID-TEA | 10 | — | — | 90 | 65 | 25 | | | | 1.32 |
| EXAMPLE 10 | POLYMETHACRYLIC ACID-TEA | 10 | — | — | 90 | 65 | 25 | | | | 1.39 |
| COMPARATIVE EXAMPLE 1 | — | — | BS-TEA | 10 | 90 | 65 | 25 | | | | 1.76 |
| COMPARATIVE EXAMPLE 2 | — | — | FS-TEA | 10 | 90 | 65 | 25 | | | | 1.88 |

PSS: POLYSTRYENESULFONIC ACID
BS: BORODISALICYLIC ACID
FS: PHTHALIC ACID
TEA: TRIETHYLAMINE
GBL: γBUTYROLACTONE
SL: SULFOLANE
EG: ETHYLENE GLYCOL
G O L: GLYCEROL
P G O L: GLYCEROL (POLYGLYCEROL)

(Evaluation)

The initial equivalent series resistance (ESR) of each electrolytic capacitor thus obtained was measured.

Then, in order to evaluate long-term reliability, the change rate (ΔESR) of the ESR was checked with each electrolytic capacitor being kept at 125° C. for 5000 hours while a rated voltage was applied thereto.

The ΔESR was shown as a proportion (X/X0) of the ESR(X) after each electrolytic capacitor to the initial value (X0) was kept at 125° C. Note that as the ESR, the value of each electrolytic capacitor at a frequency of 100 kHz was measured with a LCR meter in an environment of a room temperature.

The results are shown in Table 1.

3. Summary

An electrolytic capacitor (1) according to a first aspect includes an anode body (21), a cathode body (22), a solid compared to a monomolecular acid component. Thus, the pH of a liquid component (26) is less likely to increase, and the de-doping phenomenon is suppressed over a long time period. Thus, in the electrolytic capacitor (1), the ESR is less likely to be degraded.

In an electrolytic capacitor (1) of a second aspect referring to the first aspect, the first polymer acid component contains a sulfonic acid group.

According to the second aspect, the de-doping phenomenon that the second polymer acid component is released from the conductive polymer (250) is suppressed. Moreover, since the first polymer acid component including the carboxylic acid group is less likely to cause chemical reaction such as esterification reaction, the first polymer acid component suppresses the pH of the liquid component (26) from increasing.

In an electrolytic capacitor (1) according to a third aspect referring to the first or second aspect, the conductive polymer (250) contains a second polymer acid component.

According to the third aspect, a dopant (the second polymer acid component) is less likely to be released from the conductive polymer 250 as compared to a case where a monomolecular acid component is contained as the dopant, and in particular, the dopant (the second polymer acid component) is less likely to be released from the conductive polymer 250 even at a high temperature.

In an electrolytic capacitor (1) of a fourth aspect referring to the third aspect, the weight average molecular weight of the first polymer acid component is less than the weight average molecular weight of the second polymer acid component.

According to the fourth aspect, viscosity is suppressed from excessively increasing, anions are easily dissociated, and the anions easily move in the solvent in the liquid component (26). Moreover, in the conductive polymer 250, the first polymer acid component hardly moves, and the de-doping phenomenon is thus easily suppressed. Furthermore, when the first polymer acid component is dedoped from the conductive polymer (250), the second polymer acid component is easily doped again in a dedoped site.

In an electrolytic capacitor (1) of a fifth aspect referring to any one of the second to fourth aspects, the first polymer acid component contains one or more members selected from the group consisting of polyvinylsulfonic acid, polystyrenesulfonic acid, polyallylsulfonic acid, polyacrylic sulfonic acid, polymethacrylic sulfonic acid, poly(2-acrylamide-2-methylpropanesulfonic acid), polyisoprenesulfonic acid, polyacrylic acid, and polymethacrylic acid.

According to the fifth aspect, the de-doping phenomenon that the second polymer acid component is released from the conductive polymer (250) is suppressed. Moreover, since the polystyrenesulfonic acid is less likely to cause chemical reaction such as esterification reaction, the polystyrenesulfonic acid suppresses the pH of the liquid component (26) from increasing.

In an electrolytic capacitor (1) of a sixth aspect referring to any one of the second to fifth aspects, the conductive polymer (250) contains a second polymer acid component, and the second polymer acid component is a same kind as the first polymer acid component.

According to the sixth aspect, viscosity is suppressed from excessively increasing, anions are easily dissociated, and the anions easily move in the solvent in the liquid component (26). Moreover, in the conductive polymer (250), the second polymer acid components hardly move, and the de-doping phenomenon is thus easily suppressed. Moreover, when the second polymer acid component is dedoped from the conductive polymer (250), the first polymer acid component is easily reacted with (doped again in) the conductive polymer (250).

In an electrolytic capacitor (1) of a seventh aspect referring to any one of the first to sixth aspects, the acid component further contains a component other than the first polymer acid component.

According to the seventh aspect, the de-doping phenomenon that the second polymer acid component is released from the conductive polymer (250) is further suppressed.

In an electrolytic capacitor (1) of an eighth aspect referring to any one of the first to seventh aspects, the solvent contains a polyol including two or more hydroxyl groups.

According to the eighth aspect, the solvent in the liquid component (26) is easily suppressed from being reduced. Moreover, the pH of the liquid component is suppressed from being increased due to the occurrence of chemical reaction such as esterification reaction of the acid component in the liquid component (26).

In an electrolytic capacitor (1) of a ninth aspect referring to the eighth aspect, the polyol contains one or more members selected from the group consisting of glycerol and polyglycerol.

According to the ninth aspect, the solvent in the liquid component (26) is easily suppressed from being reduced as compared to a case where the solvent contains the ethylene glycol or the like. Moreover, the pH of the liquid component is suppressed from being increased due to the occurrence of chemical reaction such as esterification reaction of the acid component in the liquid component (26).

In an electrolytic capacitor (1) of a tenth aspect referring to any one of the first to ninth aspects, the solvent contains a polyalkylene glycol having three or more carbon atoms per repeating unit.

According to the tenth aspect, the polyalkylene glycol having three or more carbon atoms per repeating unit has a chain longer and is less likely to evaporate than a polyalkylene glycol having two or less carbon atoms per repeating unit such as polyethylene glycol. Thus, the solvent in the liquid component (26) is easily suppressed from being reduced as compared to a case where the solvent contains the polyethylene glycol or the like. Moreover, when the solvent contains the polyalkylene glycol having three or more carbon atoms per repeating unit, the solidifying point of the solvent can be lowered, and the electrolytic capacitor (1) is thus easily used at a low temperature.

REFERENCE SIGNS LIST

1 ELECTROLYTIC CAPACITOR
21 ANODE BODY
210 DIELECTRIC LAYER
22 CATHODE BODY
25 SOLID ELECTROLYTE
250 CONDUCTIVE POLYMER.
26 LIQUID COMPONENT

The invention claimed is:

1. An electrolytic capacitor, comprising:
an anode body having a surface provided with a dielectric layer;
a cathode body;
a solid electrolyte in contact with the dielectric layer, the solid electrolyte being disposed between the anode body and the cathode body, the solid electrolyte containing a conductive polymer; and
a liquid component in contact with the dielectric layer and the solid electrolyte, the liquid component containing a solvent, a basic component, and an acid component,
wherein the acid component contains a first polymer acid component including a carboxylic acid group,
the first polymer acid component contains one or more members selected from the group consisting of polyacrylic acid and polymethacrylic acid,
the conductive polymer contains a second polymer acid component, and
the second polymer acid component is a same kind as the first polymer acid component.

2. An electrolytic capacitor, comprising:
an anode body having a surface provided with a dielectric layer;
a cathode body;
a solid electrolyte in contact with the dielectric layer, the solid electrolyte being disposed between the anode body and the cathode body, the solid electrolyte containing a conductive polymer; and a liquid component in contact with the dielectric layer and the solid electrolyte, the liquid component containing a solvent and an acid component, wherein:

the acid component contains a first polymer acid component including a sulfonic acid group or a carboxylic acid group, the conductive polymer contains a second polymer acid component different from the first polymer acid component, and a weight average molecular weight of the first polymer acid component is less than a weight average molecular weight of the second polymer acid component.

3. The electrolytic capacitor of claim 2, wherein the first polymer acid component contains a sulfonic acid group.

4. The electrolytic capacitor of claim 2, wherein the first polymer acid component contains one or more members selected from the group consisting of polyvinylsulfonic acid, polystyrenesulfonic acid, polyallylsulfonic acid, polyacrylic sulfonic acid, polymethacrylic sulfonic acid, poly(2-acrylamide-2-methylpropanesulfonic acid), polyisoprenesulfonic acid, polyacrylic acid, and polymethacrylic acid.

5. The electrolytic capacitor of claim 2, wherein the second polymer acid component is a same kind as the first polymer acid component.

6. The electrolytic capacitor of claim 2, wherein the solvent contains a polyol including two or more hydroxyl groups.

7. The electrolytic capacitor of claim 6, wherein the polyol contains one or more members selected from the group consisting of glycerol and polyglycerol.

8. The electrolytic capacitor of claim 2, wherein the solvent contains a polyalkylene glycol having three or more carbon atoms per repeating unit.

9. The electrolytic capacitor of claim 2, wherein the acid component further contains a component other than the first polymer acid component.

10. An electrolytic capacitor, comprising:
an anode body having a surface provided with a dielectric layer;
a cathode body;
a solid electrolyte in contact with the dielectric layer, the solid electrolyte being disposed between the anode body and the cathode body, the solid electrolyte containing a conductive polymer; and
a liquid component in contact with the dielectric layer and the solid electrolyte, the liquid component containing a solvent, a basic component, and an acid component,
wherein the acid component contains a first polymer acid component including a carboxylic acid group,
the first polymer acid component contains one or more members selected from the group consisting of polyacrylic acid and polymethacrylic acid, and
the solvent contains a polyol including two or more hydroxyl groups.

11. The electrolytic capacitor of claim 10, wherein the polyol contains one or more members selected from the group consisting of glycerol and polyglycerol.

12. An electrolytic capacitor, comprising:
an anode body having a surface provided with a dielectric layer;
a cathode body;
a solid electrolyte in contact with the dielectric layer, the solid electrolyte being disposed between the anode body and the cathode body, the solid electrolyte containing a conductive polymer; and
a liquid component in contact with the dielectric layer and the solid electrolyte, the liquid component containing a solvent, a basic component, and an acid component,
wherein the acid component contains a first polymer acid component including a carboxylic acid group,
the first polymer acid component contains one or more members selected from the group consisting of polyacrylic acid and polymethacrylic acid, and
the solvent contains a polyalkylene glycol having three or more carbon atoms per repeating unit.

13. An electrolytic capacitor, comprising:
an anode body having a surface provided with a dielectric layer;
a cathode body;
a solid electrolyte in contact with the dielectric layer, the solid electrolyte being disposed between the anode body and the cathode body, the solid electrolyte containing a conductive polymer; and
a liquid component in contact with the dielectric layer and the solid electrolyte, the liquid component containing a solvent, a basic component, and an acid component,
wherein the acid component contains a first polymer acid component including a carboxylic acid group,
the first polymer acid component contains one or more members selected from the group consisting of polyacrylic acid and polymethacrylic acid, and
a concentration of the basic component in the liquid component is greater than or equal to 0.1 mass % and less than or equal to 20 mass %.

14. An electrolytic capacitor, comprising:
an anode body having a surface provided with a dielectric layer;
a cathode body;
a solid electrolyte in contact with the dielectric layer, the solid electrolyte being disposed between the anode body and the cathode body, the solid electrolyte containing a conductive polymer; and
a liquid component in contact with the dielectric layer and the solid electrolyte, the liquid component containing a solvent, a basic component, and an acid component,
wherein the acid component contains a first polymer acid component including a carboxylic acid group,
the first polymer acid component contains one or more members selected from the group consisting of polyacrylic acid and polymethacrylic acid, and
a pH of the liquid component is lower than or equal to 4 and higher than or equal to 2.0.

* * * * *